US012136116B2

(12) United States Patent
Choi et al.

(10) Patent No.: US 12,136,116 B2
(45) Date of Patent: Nov. 5, 2024

(54) OPERATING METHOD FOR ELECTRONIC APPARATUS FOR PROVIDING SEARCH INFORMATION AND ELECTRONIC APPARATUS THEREOF

(71) Applicant: Coupang Corp., Seoul (KR)

(72) Inventors: Ha Young Choi, Seoul (KR); Hyun Ah Oh, Seoul (KR); Jin Hee Kim, Seoul (KR); Nae Jin Hyeon, Seoul (KR); Jun Young Mun, Seoul (KR); Yoon Mi Park, Seoul (KR); Jin Hyeong Park, Seoul (KR); Ha Yeon Kim, Seoul (KR); I Seul Han, Seoul (KR)

(73) Assignee: Coupang Corp., Seoul (KR)

( * ) Notice: Subject to any disclaimer, the term of this patent is extended or adjusted under 35 U.S.C. 154(b) by 405 days.

(21) Appl. No.: 17/563,171

(22) Filed: Dec. 28, 2021

(65) Prior Publication Data
US 2023/0039682 A1    Feb. 9, 2023

(30) Foreign Application Priority Data
Aug. 9, 2021  (KR) .......................... 10-2021-0104445

(51) Int. Cl.
G06Q 30/00        (2023.01)
G06F 16/908       (2019.01)
(Continued)

(52) U.S. Cl.
CPC ....... *G06Q 30/0627* (2013.01); *G06F 16/908* (2019.01); *G06F 16/955* (2019.01); *G06Q 10/087* (2013.01); *G06Q 30/0202* (2013.01)

(58) Field of Classification Search
CPC ............ G06Q 30/0627; G06Q 30/0201; G06F 16/955; G06F 16/908
See application file for complete search history.

(56) References Cited

U.S. PATENT DOCUMENTS 10,691,744 B2 * 6/2020 Dorner .................... G06F 16/54
2010/0042635 A1   2/2010 Venkataramanujam
(Continued)

FOREIGN PATENT DOCUMENTS

CN    103020240 A      4/2013
KR   1020060099377 A    9/2006
(Continued)

OTHER PUBLICATIONS

Chen, Cheih-Ying, et al. "Screen layout on color search task for customized product color combination selection." Human-Computer Interaction. Interaction Platforms and Techniques: 12th International Conference, HCI International 2007, Beijing, China, Jul. 22-27, 2007, Proceedings, Part II 12. Springer Berlin Heide.*

*Primary Examiner* — Kathleen Palavecino
(74) *Attorney, Agent, or Firm* — Banner & Witcoff, Ltd.

(57) ABSTRACT

According to the present disclosure, there is disclosed a method of providing search information using an electronic apparatus, which includes: checking information on a product group corresponding to a keyword acquired from a user; checking color information on one or more products included in the product group; and providing a search result page corresponding to the keyword, the search result page including at least some of one or more color chips corresponding to the information on the product group and the color information on the one or more products.

20 Claims, 9 Drawing Sheets

(51) Int. Cl.
*G06F 16/955* (2019.01)
*G06Q 10/087* (2023.01)
*G06Q 30/0202* (2023.01)
*G06Q 30/0601* (2023.01)

(56) References Cited

U.S. PATENT DOCUMENTS

| | | | |
|---|---|---|---|
| 2014/0052584 A1* | 2/2014 | Gershon | G09G 5/06 |
| | | | 705/26.63 |
| 2014/0324632 A1* | 10/2014 | Enomoto | G06F 16/345 |
| | | | 705/26.62 |
| 2017/0287061 A1 | 10/2017 | Chae et al. | |
| 2018/0197226 A1* | 7/2018 | Kobayashi | G06V 10/56 |
| 2019/0012334 A1* | 1/2019 | Petrou | G06F 16/5838 |
| 2020/0285671 A1* | 9/2020 | Doh | G06F 16/7867 |
| 2021/0103969 A1* | 4/2021 | Sollami | G06Q 30/0625 |

FOREIGN PATENT DOCUMENTS

| | | |
|---|---|---|
| KR | 1020080032890 A | 4/2008 |
| KR | 100889230 B1 | 3/2009 |
| KR | 10-1500849 B1 | 3/2015 |
| KR | 1020150059714 A | 6/2015 |
| KR | 1020160147514 A | 12/2016 |
| KR | 10-1756594 B1 | 7/2017 |
| KR | 101765184 B1 | 8/2017 |
| KR | 1020170091402 A | 8/2017 |
| KR | 1020170112569 A | 10/2017 |
| TW | 202036427 A | 10/2020 |

* cited by examiner

FIG. 5

| Color classification series | White series | Gray series | Red series | Green series | ... |
|---|---|---|---|---|---|
| Color series code | #ffffff | #808080 | #ff0000 | #008000 | |
| Color keyword number | 164 | 245 | 142 | 428 | |
| Color keyword | White color | Gray | Red color | Green color | ... |
| | White | Ash color | Crimson color | Green | |
| | Maple white | Dark gray | Fire red color | Green-like | |
| | Milk | Dark gray color | Rose | Dark green | |
| | Vanilla white | Charcoal gray | Rosy red | Dark green color | |
| | Ivory | Charcoal color | Bright red | Dark sea green | |
| | Ivory color | Dark charcoal | Red orange | Dark sea green color | |
| | Ivory-similar | Deep charcoal | Red flamingo | Khaki | |
| | Ivory-like color | Dim gray | Peach bloom color | Dark khaki | |
| | Snow white color | Hampton Gray | Burgundy | Ash Green | |
| | Snow | Hampton ash color | Burgundy wine | Black green | |
| | Snow White | Nocturn gray | Wine color | Greenish yellow | |
| | Rice apricot | Light gray | Rose wine | Gadolinite | |
| | ... | ... | ... | ... | |
| Respective color chip | ○ | ◉ | ⊘ | ⊗ | ... |

OPERATING METHOD FOR ELECTRONIC APPARATUS FOR PROVIDING SEARCH INFORMATION AND ELECTRONIC APPARATUS THEREOF

This application claims the benefit of Korean Application No. 10-2021-0104445, filed Aug. 9, 2021. The present application claims priority to and the benefit of the above-identified application and patent and the above-identified application and patent are incorporated by reference herein in its entirety.

TECHNICAL FIELD

The present disclosure relates to a method of providing search information using an electric apparatus and an electronic apparatus therefor, and more particularly, to a method of providing search information including information about a product group corresponding to a keyword acquired from a user and color chip information corresponding to color information of a product included in the product group, and an electronic apparatus therefor.

DESCRIPTION OF THE RELATED ART

With the development of electronic technologies, electronic commerce has been established as a field of shopping. Customers can purchase items online without going to shopping malls or markets in person. Items purchased online are delivered to delivery destinations requested by customers.

In the case of electronic commerce, providing detailed and accurate information about goods has a significant influence on service satisfaction of customers in a service. Accordingly, various methods of providing more detailed and accurate information to customers are being discussed.

In this regard, documents in the related art such as Korean Patent Application Registration Nos. 101756594B1 and 101500849B1 may be incorporated by reference.

DISCLOSURE OF THE INVENTION

This application claims the benefit of Korean Application No. 10-2021-0104445, filed Aug. 9, 2021. The present application claims priority to and the benefit of the above-identified application and patent and the above-identified application and patent are incorporated by reference herein in its entirety.

According to a method of the present disclosure, an electronic apparatus is capable of providing search information including information about a product group corresponding to a keyword acquired from a user and color chip information corresponding to color information of a product included in the product group.

The technical objects to be achieved in the present disclosure are not limited to the technical objects described above, and other technical objects not mentioned herein will be clearly understood by those skilled in the art from the following description.

In various example embodiments, a method of providing search information and an electronic apparatus therefor.

According to various example embodiments, a method of providing search information using an electronic apparatus may include: checking information about a product group corresponding to a keyword acquired from a user; checking color information about one or more products included in the product group; and providing a search result page corresponding to the keyword, the search result page including at least some color chips of one or more color chips corresponding to the information about the product group and the color information about the one or more products.

In an example embodiment, the information about the product group may be determined as information about a product with a highest sales volume among the one or more products.

In an example embodiment, an order in which the at least some color chips of the one or more color chips are displayed may be determined based on a sales volume of a product corresponding to each of the at least some color chips.

In an example embodiment, the information about the product group may be determined as information about a first registered product among the one or more products.

In an example embodiment, an order in which the at least some color chips of the one or more color chips are displayed may be determined based on a registration order of a product corresponding to each of the at least some color chips.

In an example embodiment, the information about the product group may include image information about a product determined for the information about the product group, and when the user makes an input with respect to a first color chip included in the at least some color chips on the search result page, the image information may be changed to first image information about a first product corresponding to the first color chip.

In an example embodiment, the first image information about the first color chip included in the at least some color chips may be included in a detail page of the first product.

In an example embodiment, the method may further include: in response to a user's input with respect to the information about the product group, providing a detail page of a product determined for the information about the product group.

In an example embodiment, the method may further include: in response to a user's input with respect to a first color chip included in the at least some color chips, providing a detail page of a first product having first color information corresponding to the first color chip.

In an example embodiment, information about the first color chip may include information about a uniform resource locator (URL) corresponding to the detail page of the first product.

In an example embodiment, the detail page of the first product may include color change information for selecting color information corresponding to the at least some color chips, and in response to a user's input with respect to the color change information to set to second color information, an item the user wants to purchase may be changed from the first product to a second product corresponding to the second color information.

In an example embodiment, the method may further include: displaying information for identifying a color chip corresponding to the information about the product group among the at least some color chips.

In an example embodiment, information about a first color chip included in the at least some color chips may include information about whether or not the first color chip is equivalent to a color chip corresponding to a product determined for the information about the product group.

In an example embodiment, the at least some color chips may be a certain number of color chips selected from the one or more color chips, and the number of remaining color chips other than the certain number of color chips selected from the one or more color chips may be displayed on the search result page.

In an example embodiment, the at least some color chips may be determined based on a stock quantity of a product corresponding to each of the at least some color chips.

In an example embodiment, the method may further include: acquiring a first color keyword indicating first color information corresponding to a first color chip included in the at least some color chips and at least one color keyword indicating at least one color information in a range similar to the first color information; setting a color keyword set including the first color keyword and the at least one color keyword; and setting information about the first color chip that includes information about the color keyword set.

In an example embodiment, the first color keyword and the at least one color keyword may be acquired from a provider linked to the product group through a service associated with the electronic apparatus.

In an example embodiment, the method may further include: when the color keyword included in the color keyword set is acquired to register a product included in the product group, setting the first color chip to a color chip corresponding to color information indicated by the color keyword and the product.

According to various example embodiments, an electronic apparatus of providing search information may include a processor, and one or more memories storing one or more instructions. The one or more instructions, when executed, may control the processor to: check information about a product group corresponding to a keyword acquired from a user; check color information about one or more products included in the product group; and provide a search result page corresponding to the keyword, the search result page including at least some color chips of one or more color chips corresponding to the information about the product group and the color information about the one or more products.

According to various example embodiments, an electronic apparatus for outputting search information may include a processor, and one or more memories storing one or more instructions. The one or more instructions, when executed, may control the processor to: acquire a keyword associated with a product group from a user; transmit the keyword to a server device; receive a search result page including at least some color chips of one or more one color chips corresponding to information about the product group and color information about one or more products included in the product group, which is output from the server device in response to the keyword; and output the search result page.

The various example embodiments of the present disclosure described above are merely some of the preferred example embodiments of the present disclosure. It will be understood by those skilled in the art that various example embodiments in which technical features of the various example embodiments of the present disclosure are reflected may be derived based on the following detailed description.

The present disclosure has technical effects in that it is possible to improve a user's search convenience and enhance a user's experience of a search result page by presenting a method of providing information about selectable color in a product group on a search result page together with information about the product group using an electronic apparatus.

In addition, the present disclosure has technical effects in that it is possible to achieve color management convenience for a product group by presenting a method of setting color information within one or more similar ranges using an electronic apparatus such that various pieces of color keyword text input by a seller of a product corresponds to one piece of color chip information.

The effects that can be obtained in the present disclosure are not limited to the aforementioned effects, and other effects not mentioned herein will be clearly understood by those skilled in the art from the following description.

BRIEF DESCRIPTION OF THE DRAWINGS

FIG. 5 is a diagram illustrating an example in which the server device manages the information about the color keyword set according to various example embodiments.

DETAILED DESCRIPTION OF THE INVENTION

The following example embodiments are obtained by combining constituent elements and features of various example embodiments in a predetermined form. Each of the constituent element or the features may be considered optional, unless explicitly other stated. Each of the constituent elements or the features may be defined in a form in which it is not coupled with another constituent element or feature. In addition, some of the constituent elements and the features may be combined with each other to implement various example embodiments. The order of operations which will be described in various example embodiments may be changed. Some of the constituent elements or the features of any of the example embodiments may be included in other example embodiments, or may be replaced with corresponding those of other example embodiments.

In the description of the drawings, procedures, or steps that may obscure the gist of various example embodiments and the like have not been described, and procedures or steps that may be understood by those skilled in the art have also not been described.

When a part "comprise or includes" a constituent element through the specification, this means that the part may further include other constituent elements, instead of excluding other constituent elements, unless other stated. In addition, the terms such as "part," "-er or-or," "module," and the like mentioned herein may refer to a unit that performs at least one function or operation, which may be realized as hardware or software, or may be realized as a combination of hardware and software. Further, the word "a or an," "one," "the," and similar words may be used to include the singular form or the plural form, unless the contents (specifically, the contents in the claims) describing various example embodiments clearly dictates otherwise.

Some example embodiments of the present disclosure will be described in detail below with reference to the accompanying drawings. The detailed description to be disclosed below in conjunction with the accompanying drawings is intended to describe examples of various example embodiments and is not limited thereto.

Furthermore, specific terms used in various example embodiments are provided to facilitate overall understanding of various example embodiments, and the use of such specific terms may be changed to other terms without departing from the technical ideas of the various example embodiments.

Figure 1:
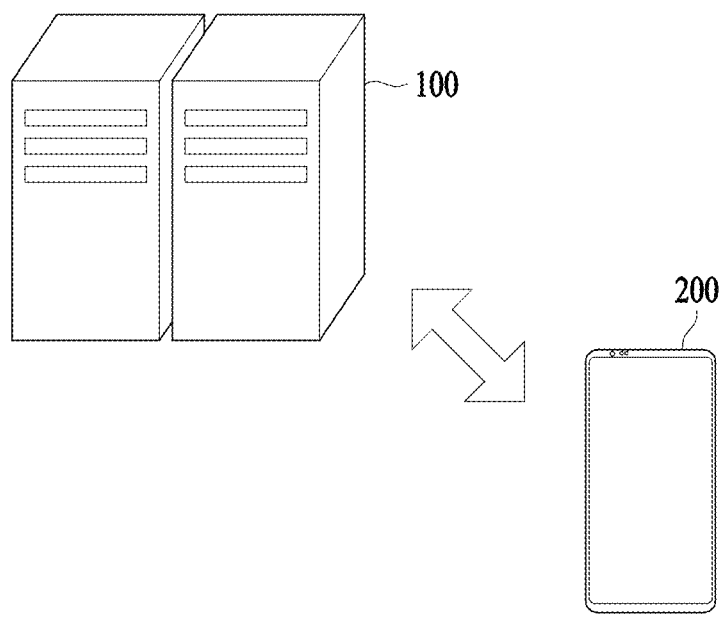
FIG. 1 is a diagram for explaining a search information providing system capable of implementing an operation method of providing search information using an electronic apparatus according to various example embodiments.

FIG. 1 is a diagram for explaining a search information providing system capable of implementing an operation method of providing search information using an electronic apparatus according to various example embodiments.

Referring to FIG. 1, the search information providing system according to various example embodiments may be implemented with various kinds of electronic apparatuses. For example, a search information providing system may be implemented with server devices 100 and user devices 200. In other words, each of the server devices 100 and the user devices 200 may perform operations according to various example embodiments of the present disclosure based on the search information providing system implemented in each apparatus. However, the search information providing system according to various example embodiments is not limited to that illustrated in FIG. 1, but may be implemented with other various kinds of electronic apparatuses and servers.

The server device 100 according to various example embodiments may be an apparatus that can communicate with a plurality of user devices 200 in a wired and wireless manner and may include a large storage capacity. For example, the server device 100 may be a cloud device in conjunction with the plurality of user devices 200.

The user device 200 according to various example embodiments may be an apparatus that can be used by an individual user, such as a desktop personal computer (PC), a tablet PC, or a mobile terminal. In addition, other electronic apparatuses that perform the same function as above may be used as the user device 200.

The search information providing system according to various example embodiments may include various operation modules. The operation modules included in the search information providing system may include computer codes or one or more instructions that are implemented such that a physical apparatus (for example, the server device 100 and the user device 200) constituting the search information providing system (or included in the physical apparatus) executes an operation assigned thereto. In other words, in the physical apparatus constituting the search information providing system, the plurality of operation modules may be stored in a memory in the form of computer codes. The plurality of operation modules stored in the memory, when executed, may be configured such that the physical apparatus performs assigned operations corresponding to the plurality of operation modules.

Figure 2:
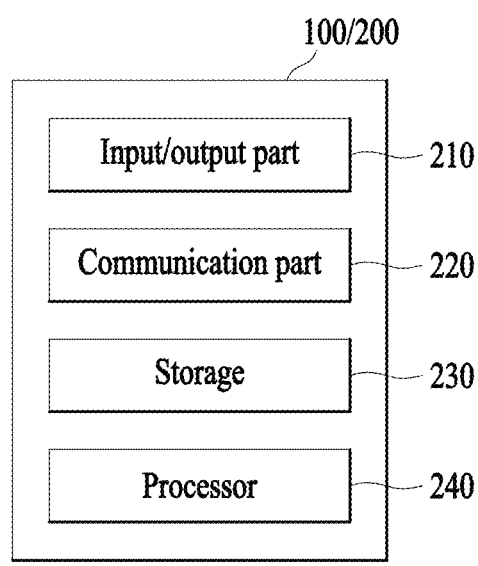
FIG. 2 is a diagram illustrating configurations of a server device and a user device according to various example embodiments.

FIG. 2 is a diagram illustrating configurations of the server device and the user device according to various example embodiments.

Referring to FIG. 2, each of the server device 100 and the user device 200 may include an input/output part 210, a communication part 220, a storage 230, and a processor 240.

The input/output part 210 may be various kinds of interfaces, various kinds of connection ports, or the like through which receive a user's input or output information to the user. The input/output part 210 may include an input operation module and an output operation module. The input operation module receives the user's input. The user's input may have various forms of inputs, including key inputs, touch inputs, and audio inputs. Examples of the input operation module that can receive such a user's input include a traditional form of keypad or keyboard, a mouse, as well as a touch sensor that senses a user's touch, a microphone that receives an audio signal, a camera that recognizes a gesture or the like through image recognition, a proximity sensor that includes at least one of an illumination sensor or an infrared sensor that senses approaching of user, a motion sensor that recognizes a user's action through an acceleration sensor or a gyro sensor, and various forms of input means that sense or input various forms of user's input, and the input operation module according to an example embodiment of the present disclosure may include at least one of the above-listed devices. Here, the touch sensor may be implemented with a piezoelectric or capacitive touch sensor that senses touch via a touch panel or a touch film attached to a display panel, an optical touch sensor that senses a touch by an optical method, or the like. Besides, the input operation module may be implemented in the form of an input interface (universal serial bus (USB) port, personal system (PS)/2 port, or the like) connecting an external input device to which a user's input is received, instead of a device that senses a user's input by itself. Further, the output operation module may output various kinds of pieces of information. The output operation module may include at least one of a display for outputting an image, a speaker for outputting an audio, a haptic device for generating a vibration, and other various forms of output means. In addition, the output operation module may also be implemented in the form of an output interface of the port type connecting the aforementioned individual output means.

As one example, an output operation module in the form of display may display text, a still image, and a moving image. The display may include at least one of a liquid crystal display (LCD), a light emitting diode (LED) display, an organic light emitting diode (OLEO) display, a flat panel display (FPD), a transparent display, a curved display, a flexible display, a three-dimensional display, a holographic display, a projector, and other types of apparatus capable of performing image output functions. Such a display may have in the form of touch display that is configured integrally with the touch sensor of the input operation module.

The communication part 220 can communicate with another apparatus. Thus, each of the server device 100 and the user device 200 may transmit or receive information to and from another apparatus via the communication part 220. For example, the server device 100 and the user device 200 can communication with each other or another apparatus using the communication part 220.

Here, communication, that is, transmission and reception of data, may be performed in a wired or wireless manner. To this end, the communication part may include a wired communication module connected to the Internet or the like via a local region network (LAN), a mobile communication module connected to a mobile communication network via a mobile communication base station to transmit and receive data, a near field communication module using a wireless local area network (WLAN)-series communication scheme such as wireless fidelity (Wi-Fi), or a wireless personal area network (WPAN)-series communication scheme such as Bluetooth or Zigbee, a satellite communication module using a global navigation satellite system (GNSS) such as a global positioning system, or a combination thereof.

The storage 230 may store various pieces of information. The storage 230 may store data temporarily or semi-permanently. For example, an operating system (OS) for driving the server 100, data for hosting a web site, data about a program or application (for example, a web application) for generating braille, or the like may be stored in the storage of the server 100. Furthermore, the storage may store operation modules in the form of computer codes as described above.

Examples of the storage 230 may include a hard disk (HDD), a solid-state drive (SSD), a flash memory, a read-only memory (ROM), a random-access memory (RAM), and the like. Such a storage may be provided in a built-in type or a detachable type The processor 240 controls the overall operation of the server device 100 and the user device 200. To this end, the processor 240 may perform computation and processing of various pieces of information and control operation of constituent elements of the server device 100. For example, the processor 240 may execute programs or applications of providing search information. The processor 240 may be implemented with a computer or a device similar thereto depending on hardware, software, or a combination thereof. The processor 240 may be implemented in the form of electronic circuit that processes electrical signals to perform control functions in hardware, and may be implemented in the form of program that drives the hardware processor 240 in software. Meanwhile, it may be interpreted that the operation of the server device 100 and the user device 200 is performed under the control of the processor 240, unless particularly other stated in the following description. That is, operation modules implemented in the search information providing system described above, when executed, may be interpreted as the processor 240 controls the server device 100 and the user device 200 to perform the following operations.

In summary, various example embodiments may be implemented with various means. For example, the various example embodiments may be implemented by hardware, firmware, software, a combination thereof, or the like.

In the case of implementation by hardware, a method according to various example embodiments may be implemented by one or more application specific integrated circuits (ASICs), digital signal processors (DSPs), digital signal processing devices (DSPs), programmable logic devices (PLDs), field programmable gate arrays (FPGAs), processors, controllers, micro controllers, micro-processors, or the like.

In the case of implementation by firmware or software, a method according to various example embodiments may be implemented in the form of operation modules, procedures or functions that perform functions or operations to be described below. For example, the software codes may be stored in a memory and driven by a processor. The memory may be located inside or outside the processor, and may transmit or receive data to or from the processor by various means already known.

Various example embodiments will be described in more detail below based on the technical ideas as described above. The above-described contents may be applied to various example embodiments to be described below. For example, operations, functions, terms, or the like that are not defined in the various example embodiments to be described below may be performed and described based on the contents described above.

In the following description, various example embodiments in which the server device 100 performs a search information providing operation will be described. According to various example embodiments, the server device 100 or the user device 200 that has received search information from the server device 100 may output the search information.

Figure 3:
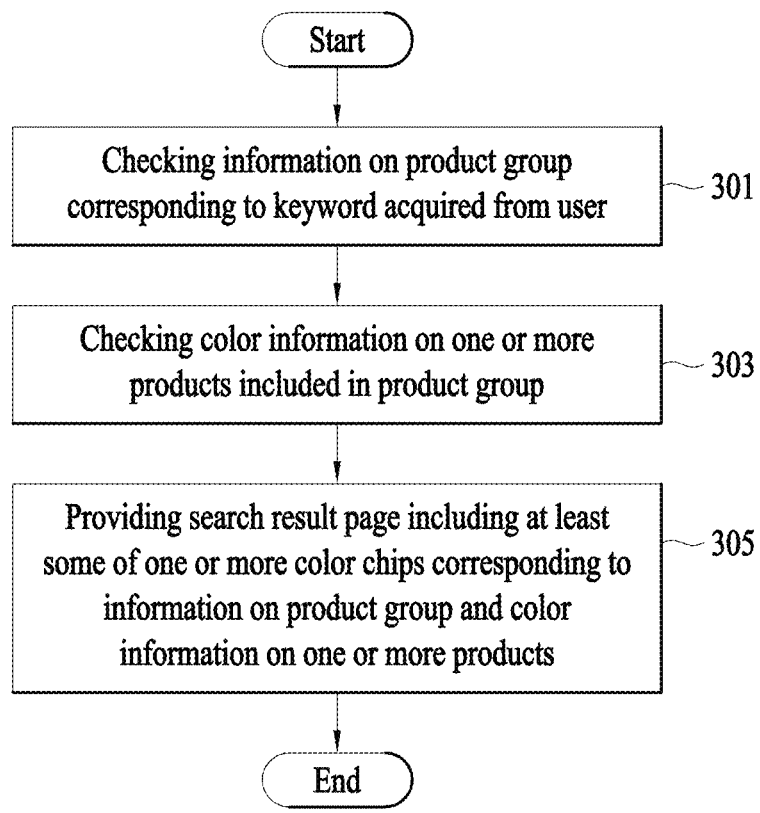
FIG. 3 is a diagram illustrating an example of an operation method of the server device of providing search information according to various example embodiments.

FIG. 3 is a diagram illustrating an example of an operation method of providing search information using the server device 100 according to various example embodiments.

According to various example embodiments, in operation 301, the server device 100 may check information about a product group corresponding to a keyword acquired from the user.

For example, the server device 100 may receive or acquire a keyword input by the user through the user device 200. That is, the user device 200 may acquire a keyword associated with the product group from the user and transmit the same to the server device 100.

For example, the keyword acquired by the server device 100 from the user may be information about a product name of a product associated with the keyword, information about the product group into which the product may be sorted, or other pieces of text that may represent the product or the product group.

For example, the information about the product group checked by the server device 100 may include a name that refers to the product group, one or more products included in the product group, and information relating to a purchase of each of the one or more products. Here, the information relating to the purchase of each product may refer to information to be provided to a user who wants to purchase the product, such as a name, image, intended use, price, discount rate or the like of the product, whether or not return of the produce is possible, and the like.

For example, information about a specific product among the one or more products included in the product group checked by the server device 100 may be set as representative information about the product group. In operation 305 (to be described later), in the case in which the server device 100 provides the search result page corresponding to the keyword input by the user, the information about the specific product may be used as a search result to be included in the search result page in relation with the product group.

According to various example embodiments, in operation 303, the server device 100 may check color information about the one or more products included in the checked product group.

For example, the one or more products having the color information checked by the server device 100 in operation 303 may correspond to products having different pieces of color information included in a specific product group. That is, one or more products having different pieces of color information may be included in the specific product group.

For example, the color information about the one or more products checked by the server device 100 in operation 303 may be information included in the information about the product group checked in operation 301, or may be information checked by a check operation performed additionally by the server device 100 based on the information about the product group checked by the server device 100 in operation 301.

For example, the color information about the one or more products may include color information about each of the one or more products. Such color information about each product may be indicated or checked with a color keyword or color keyword text representing the respective color information.

For example, the color information about the one or more products may be included in information relating to purchase of the one or more products, and may be managed by the server device 100.

According to various example embodiments, in operation 305, the server device 100 may provide a search result page including at least some color chips of one or more color chips corresponding to the information about the checked product group and the color information about the checked one or more products.

The term "color chip" used in the following embodiments may refer to information in the form of chip having a representative color that may be a representative of a color indicated by the color information or a color group to which the color indicated by the color information belongs, based on color information of products included in a product group. The color chip may be information in a visual form. The server device 100 may map various pieces of related information to a specific color chip and set information about the specific color chip according to various example embodiments described below. Although each embodiment will be described below with reference to a color chip, the form of a color icon showing a color of each product and a color corresponding to the color may be used.

For example, the information about the product group included and displayed in the search result page provided by the server device 100 in operation 305 may be determined as information about a product with the highest sales volume among the one or more products included in the product group. That is, one or more products having different pieces of color information may be included in one product group. The server device 100 may acquire information about a sales volume of each of the one or more products and manage the same as information about the product group. Further, the server device 100 may utilize information about the product with the highest sales volume as the information about the product group to be displayed on the search result page.

In this case, at least some of the color chips included in the search result page provided by the server device 100 in operation 305 may correspond to color chips selected based on a sales volume of a product corresponding to each color chip among the one or more color chips corresponding to the color information about the one or more products included in the product group. An order in which the at least some of the color chips are displayed in the search result page may be determined based on a sales volume of each product. As an example, among the one or more color chips corresponding to the color information about the one or more products included in the product group, color chips corresponding to some or all of the products may be listed and displayed in the search result page in the increasing order of sales volume.

For example, the information about the product group included in the search result page provided by the server device 100 in operation 305 may be determined as information about a first registered product among the one or more products included in the product group. That is, in the service associated with the server device 100, one or more products having different pieces of color information may be registered to one product group by sellers of the products. The server device 100 may acquire information about a registration order of each of the one or more products and manage the same as information about the product group. Further, the server device 100 may utilize information about the first registered product for the information for the product group to be displayed in the search result page.

In this case, the at least some of the color chips included in the search result page provided by the server device 100 in operation 305 may correspond to color chips selected based on the registration order of a product corresponding to each color chip to the product group, among the one or more color chips corresponding to the color information about the one or more products included in the product group. An order in which the at least some color chips are displayed in the search result page may be determined based on the registration order of the products. As an example, among the one or more color chips corresponding to the color information about the one or more products included in the product group, color chips corresponding to some or all of the products may be listed and displayed in the search result page in the registration order of the respective products.

For example, the information about the product group included in the search result page provided by the server device 100 in operation 305 may include image information about a product that is determined for the information about the product group to be included in the search result page, among the one or more products included in the product group. Here, the product determined for the information about the product group to be included in the search result page may correspond to a representative product for the product group. The representative product may be a product with the highest sales volume or a first registered product in the product group, among the one or more products included in the product group. The image information may correspond to image information about the representative product, and may also be used as representative image information about the product group.

The representative image information set as described above may be information about one product group corresponding to one search result and may be displayed in a portion of a specific region corresponding to the one search result in the search result page. That is, the region in the search result page in which the search result is displayed may include a region in which image information for the information about the product group is displayed.

Information about one product group corresponding to one search result may be set such that the representative image information is provided as a basic value on the search result page. When the user makes an input using a mouse with respect to a specific color chip other than a color chip corresponding to the representative image information among the at least some of the color chips displayed in the search result page, that is, when the user makes at least one of a mouse-on input, a mouse-hold input, and a mouse-touch input with respect to the specific color chip on the search result page, image information provided on the region in which the image information is to be displayed may be changed from the representative image information to image information about a product having color information corresponding to the specific color chip.

To this end, image information about a product having color information corresponding to one specific color chip may be set to be included in information for the one specific color chip. The changing the image information in response to the mouse's movement performed by the user with respect to the color chip on the search result page as described above, may be performed based on that image information about a product corresponding to each color chip is configured. That is, in the case in which image information capable of checking specific color information about a product corresponding to a color chip is set for the color chip, the image information provided through the search result page in which the respective color chip is displayed may be set to be changed to image information about the product corresponding to the color chip according to a mouse's movement performed by the user on the color chip. Alternatively, in a case in which image information about a product having color information corresponding to one specific color chip is included in an item detail page of the product, the image information provided through the search result page in which the color chip is displayed may be set to be changed to the image information about the product corresponding to the color chip according to the mouse's movement performed by the user on the color chip by further extending the manner described above.

For example, the information about the product group included and displayed in the search result page provided by the server device 100 in operation 305 and the at least some of the color chips may be set to provide the item detail page of each product in response to a user's input.

As an example, upon acquiring a user's input with respect to the information about the product group included and displayed in the search result page, the server device 100 that performs providing the search result page in operation 305 may further perform providing an item detail page of a product determined for the information about the product group.

Alternatively, as an example, upon acquiring a user's input with respect to a first color chip included in the at least some of the color chips included and displayed in the search result page, the server device 100 that performs providing the search result page in operation 305 may further perform providing an item detail page of a first product having first color information corresponding to the first color chip. To this end, information about a uniform resource locator (URL) of the item detail page of the first product may be set to be included in information about the first color chip.

In the case in which the server device 100 provides the item detail page of the first product in response to a user's input with respect to the first color chip on the search result page, the item detail page may be set such that the first product and first color information about the first product are basically displayed as information about an item the user wants to purchase.

In this case, the item detail page may provide color change information to the user so as to be able to select products of other colors included in the product group in which the first product is included. When the user inputs another color information other than the above first color information as the color change information, information about an item the user wants to purchase may be set to be changed to the another color information and a product having the another color information.

For example, the server device 100 that performs providing the search result page in operation 305 may further perform displaying information for identifying a color chip corresponding to the information about the product group included and displayed in the search result page, among the at least some of the color chips included and displayed in the search result page. As an example, through the above-described operation, additional identification information can be displayed with the color chip corresponding to the information about the product group included and with this configuration, the color chip may be distinguished from other color chips of at least some color chips included and displayed in the search result page.

For example, information about a color chip included in the one or more color chips corresponding to the color information about the one or more products checked by the server device 100 may include information about whether or not the respective color chip is a color chip corresponding to a product determined for the information about the product group included and displayed in the search result page provided by the server device 100 in operation 305. That is, in management of information about each color chip, the server device 100 may set a field value indicating information about whether or not a product having color information corresponding to each color chip is a product determined for the information about the product group. When a specific color chip is a color chip corresponding to the product determined for the information about the product group included and displayed in the search result page, "True" may be set as the field value. When the specific color chip is not a color chip corresponding to the product determined for the information about the product group included and displayed in the search result page, "False" may be set as the field value.

The fact that the information about whether or not the respective color chip is a color chip corresponding to a product determined for the information about the product group included and displayed in the search result page provided by the server device 100 is included in the information about the color chip, may be utilized when the server device 100 performs the operation of displaying the information for identifying the color chip corresponding to the information about the product group included and displayed in the search result page among the at least some color chips included and displayed in the search result page as described above. That is, the server device 100 may set such that, for each of the one or more color chips corresponding to the color information about the one or more products included in the product group, the information about whether or not the respective color chip is equivalent to a color chip corresponding to a product determined for the information about the product group included and displayed in the search result page provided by the server device 100 is included in the information about the color chip. When the information indicating that the respective color chip is equivalent to the color chip corresponding to the determined product has been included in the information about the specific color chip, information for identifying the specific color chip may be displayed on the search result page.

For example, the at least some of the color chips included in the search result page provided by the server device 100 in operation 305 may be a certain number of color chips selected from the one or more color chips corresponding to the color information about the one or more products included in the product group. A color image of the certain number of selected color chips may be displayed in the search result page, and the number of the remaining unselected color chips may be displayed in the search result page. The above certain number of selected color chips to be displayed in the search result page may be a number set in advance for the product group by the server device 100, or may be a number set differently depending on a condition of a user interface (UI)/user experience (UX) of the user device 200. As an example, the server device 100 may limit the number of color chips to be displayed in the search result page for a specific product group. For example, the number of color chips, which exceeds the limited number, may be indicated by a numeric character. Alternatively, as another example, the service device 100 may not limit the number of color chips to be displayed in the search result page for a specific product group. For example, the number of color chips to be displayed in the search result page may be set differently depending on a screen size of the user device 200 that outputs the search result page.

For example, the at least some color chips included and displayed in the search result page provided by the server device 100 in operation 305 may be determined based on whether or not products having color information about each of the color chips are in stock. That is, the at least some of the color chips may be color chips determined based on stock quantities of the products corresponding to the respective color chips. When a certain product is not in stock, a color chip corresponding to the certain product may not be set.

It is clear to those skilled in the art that individual pieces of information provided by the server device 100 in operation 305 may be combined with each other in various forms and may be provided while included in the search result page.

On the other hand, for a specific color chip included in the one or more color chips corresponding to the color information about the one or more products included in the product group checked by the server device 100, the server device 100 may manage, as information about the specific color chip, a color keyword or color keyword text associated with color information corresponding to the specific color chip and other similar color information. Specifically, as illustrated in FIG. 4, the server device 100 may set a color keyword set for color information corresponding to a specific color chip.

Figure 4:
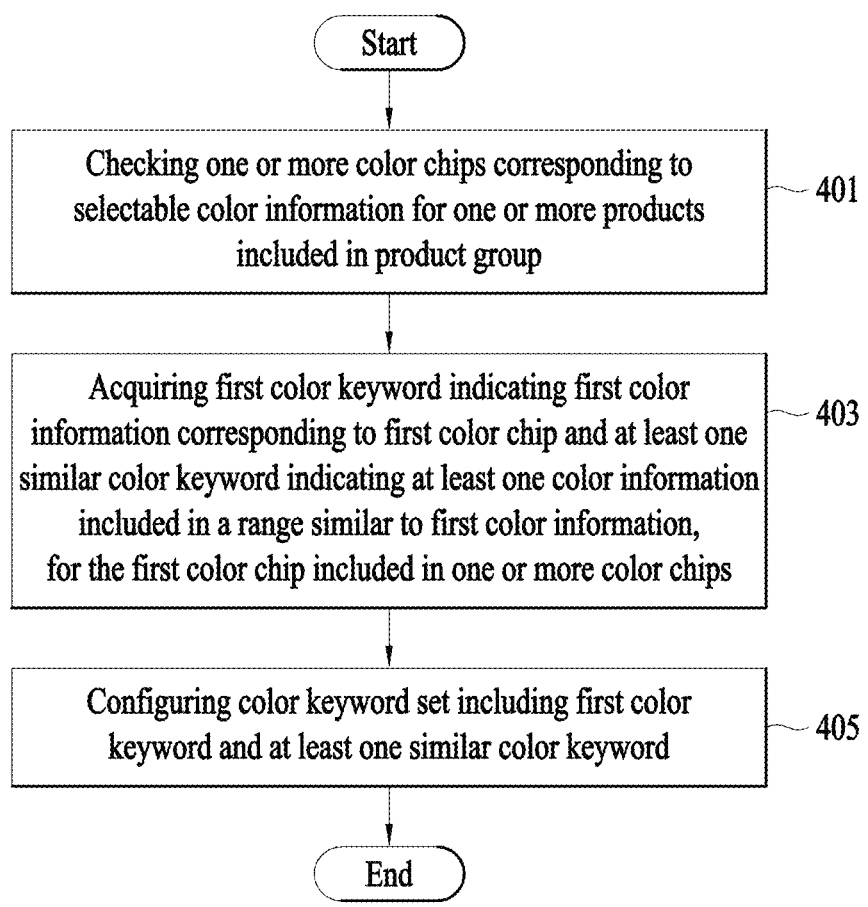
FIG. 4 is a diagram illustrating a method in which the server device sets information about a color keyword set according to various example embodiments.

FIG. 4 is a diagram illustrating a method in which the server device 100 sets information about a color keyword set according to various example embodiments.

In FIG. 4, the server device 100 may check one or more color chips corresponding to selectable color information for the one or more products included in the product group in operations 301 to 305 (401).

Subsequently, the server device 100 may acquire a first color keyword or first color keyword text indicating first color information corresponding to a first color chip included in the one or more color chips, and at least one similar color keyword or similar color keyword text indicating at least one color information included within a range similar to the first color information (403).

In this case, the color keyword or the color keyword text acquired by the server device 100 may be a keyword or keyword text input by a provider who is linked to the product group, through a service associated with the server device 100. That is, through the service associated with the server device 100, the provider who sells a product included in the respective product group may input a color keyword or a color keyword text to input color information about the product. The server device 100 may acquire the color keyword or the color keyword text input by the provider as information for the above color keyword set.

The server device 100 that acquires the first color keyword or the first color keyword text, and the similar color keyword or the similar color keyword text, may set the color keyword set including the first color keyword or the first color keyword text, and the similar color keyword or the similar color keyword text, to manage these keywords and text as grouped information corresponding to the first color chip (405).

That is, the color keyword set, which is set as described above based on the input made by the provider who sells the product included in the specific product group through the service associated with the server device 100, may cover one or more pieces of color information which are determined to fall within a similar range, and may include various color keywords or various pieces of color keyword text that are used to indicate the one or more pieces of color information. The color keyword set may correspond to one color chip. Consequently, one color chip may correspond to one or more pieces of color information that are determined to fall within a similar range, and may also correspond to various color keywords or various pieces of color keyword text used to indicate the one or more pieces of color information.

The server device 100, which sets the color keyword set in the above manner, may set and manage information about the first color chip to include the color keyword set.

The server device 100 managing the information about the color chip in which the color keyword set is included based on operations in FIG. 4, then subsequently, when the provider linked to the specific product group inputs a specific color keyword or specific color keyword text included in the color keyword set managed by the server device 100 to register a product included in the specific product group through the service associated with the server device 100, may check color information corresponding to the specific color keyword or the specific color keyword text input by the provider, determine a color chip corresponding thereto, and set the determined color chip as a color chip corresponding to the color information and the product.

That is, in the process of registering the product included in the specific product group, when acquiring a color keyword or a color keyword text included in a certain color keyword set, the server device 100 may perform an operation of setting the color chip corresponding to the certain color keyword set to a color chip corresponding to color information indicated by the color keyword and the product.

FIG. 5 is a diagram illustrating an example in which the server device 100 manages information about a color keyword set according to various example embodiments.

In FIG. 5, based on one or more color classification series which may include selectable color information for a product group and a color chip corresponding to each color classification series, the server device 100 may set a code for managing the color classification series and a color keyword or pieces of color keyword text corresponding to each color classification series.

The one or more color classification series may be set in advance by the server device 100 that manages the product group and products included in the product group. One color classification series may include one or more pieces of color information determined to fall within a similar range. As an example, the server device 100 may set a red color series for a product group to which products with a red color and selectable color information within a range similar thereto belong. The red color series may include several pieces of color information that may be classified to fall within a range similar to a red color depending on pieces of product color information such as red color information, peach bloom color information, burgundy color information, and the like.

In this case, the color keyword or the pieces of color keyword text indicating the one or more pieces of color information included in the one color classification series may be grouped and set to a color keyword set corresponding to that one color classification series. As described above, the server device 100 may acquire a color keyword or pieces of color keyword text indicating the one or more pieces of color information from the color keyword or the pieces of color keyword text input by the provider who sells a product to register the respective product through the service associated with the server device 100.

In the above example, 1) various color keywords or various pieces of color keyword text for indicating the red color information, for example, color keywords or pieces of color keyword text such as red, red-like, rose and the like, may be acquired by the server device 100, 2) various color keywords or various pieces of color keyword text for indicating the peach bloom color information, for example, color keywords or pieces of color keyword text such as red orange, ret flamingo and the like, may be acquired by the server device 100, and 3) various color keywords or various pieces of color keyword text for indicating the burgundy color information, for example, color keywords or pieces of color keyword text such as wine, violet, burgundy and the like, may be acquired by the server device 100. The server device 100 may group the acquired color keywords or the acquired pieces of color keyword text to set a color keyword set for the red color series and a color chip corresponding to the red color series. The above-described process may be repeatedly performed for each color classification series to acquire one or a plurality of color keywords set for one product group.

Figure 6:
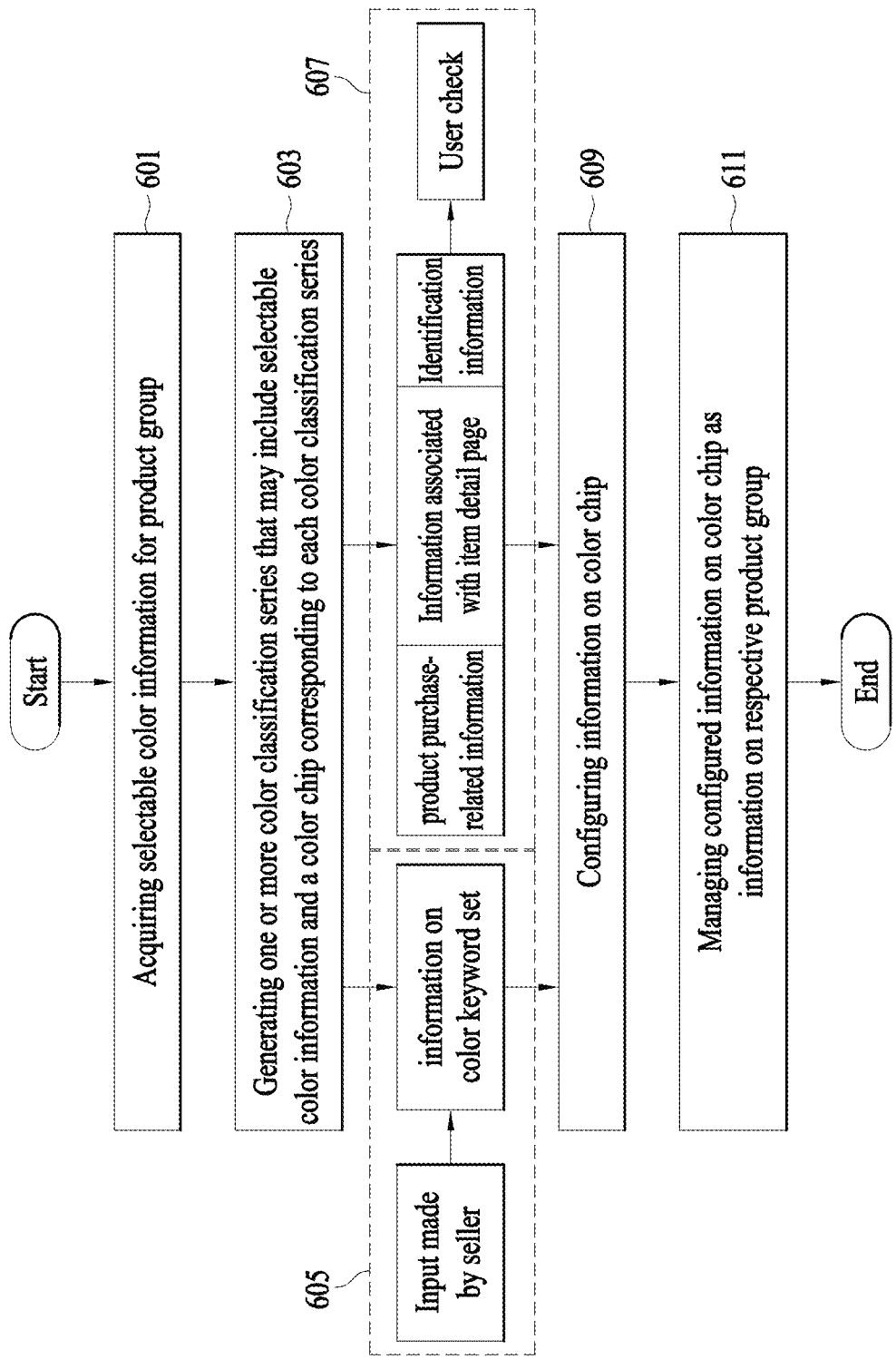
FIG. 6 is a diagram illustrating a method in which the server device sets information about a color chip according to various example embodiments.

FIG. 6 is a diagram illustrating a method in which the server device 100 sets information about a color chip according to various example embodiments.

Referring to FIG. 6, when there is a product group to which products with various pieces of selectable color information belong, the server device 100 may acquire selectable color information for the product group (in operation 601), and generate one or more color classification series that may include the selectable color information and a color chip corresponding to each color classification series (in operation 603).

In this case, in operation 605, the server device 100 may acquire information about a color keyword set including color keywords or pieces of color keyword text corresponding to the color classification series as illustrated in FIG. 5, and set information about the color chip corresponding to the color classification series so as to include the acquired information about the color keyword set. When a provider or a seller who sells a related product through the service associated with the server device 100 inputs a color keyword or pieces of color keyword text to register the related product, the server device 100 may identify the input color keyword or the input pieces of color keyword text and determine a color classification series and a color chip corresponding to the same in operation 605.

Further, in operation 607, the server device 100 may set such that the information about the color chip includes information about the color keyword set associated with the provider who sells the product as well as information required to check the user who wants to purchase the product. With the operations of the server device 100 according to the various example embodiments described above with reference to FIG. 3, the color chip may be linked to: 1) product purchase-related information, including name, image, stock, price and the like of the product having the color information corresponding to the color chip, 2) information necessary to access an item detail page of the product, and 3) identification information indicating whether or not the product having the color information corresponding to the color chip is a product determined for the information about the product group to which the product belongs. The server device 100 may check each piece of information about the product linked to the color chip and may manage the checked information in a correspondence relationship with the color chip. To do this, the server device 100 may configure the checked information to be included in the information about the color chip.

The server device 100 may set information about the color chip including a plurality of pieces of information associated with the color chip in operations 605 to 607 (in operation 609), and may manage the set information about the color chip as information about a respective product group (in operation 611).

It is clear to those skilled in the art that, in FIG. 6, the respective pieces of information acquired or checked by the server device 100 in operations 605 to 609 may be combined with each other in various forms and may be included in the information about the color chip. The set information about the color chip is not limited to being managed for the information about the product group as described in operation 611, but may be managed for other various pieces of information associated with the product group.

Figure 7:
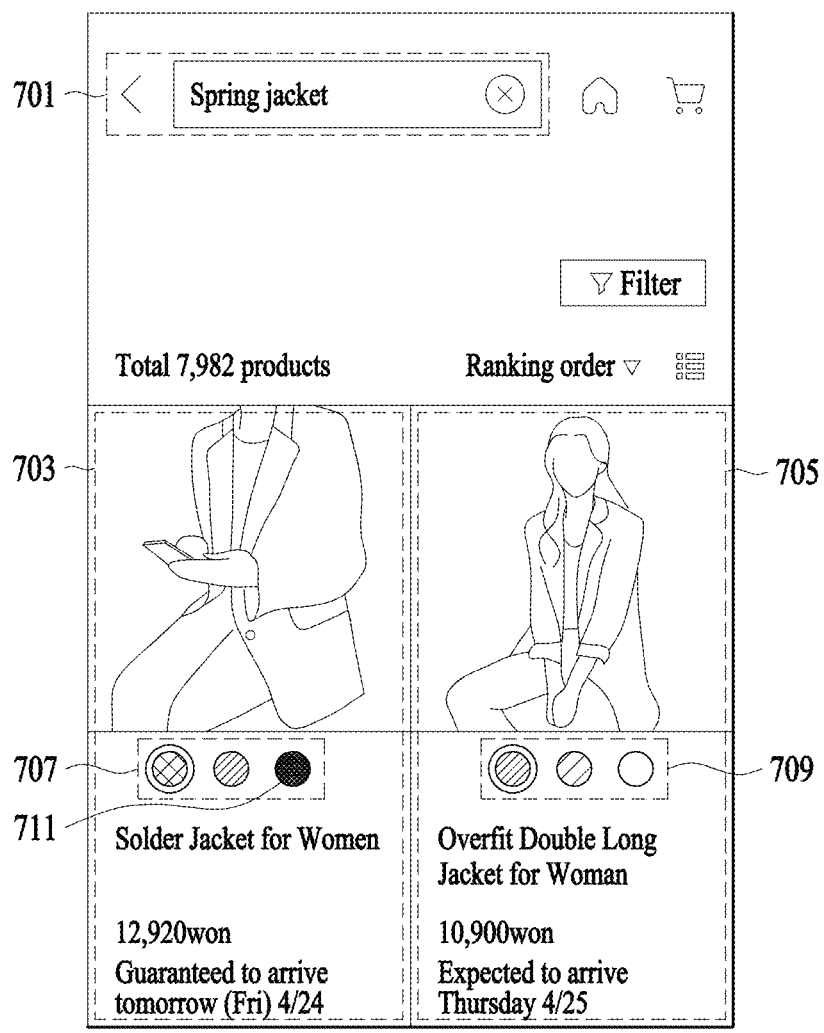
FIG. 7 is a diagram illustrating an example in which the user device outputs a search result page to a user on the basis of an operation of the server device according to various example embodiments.
Figure 8:
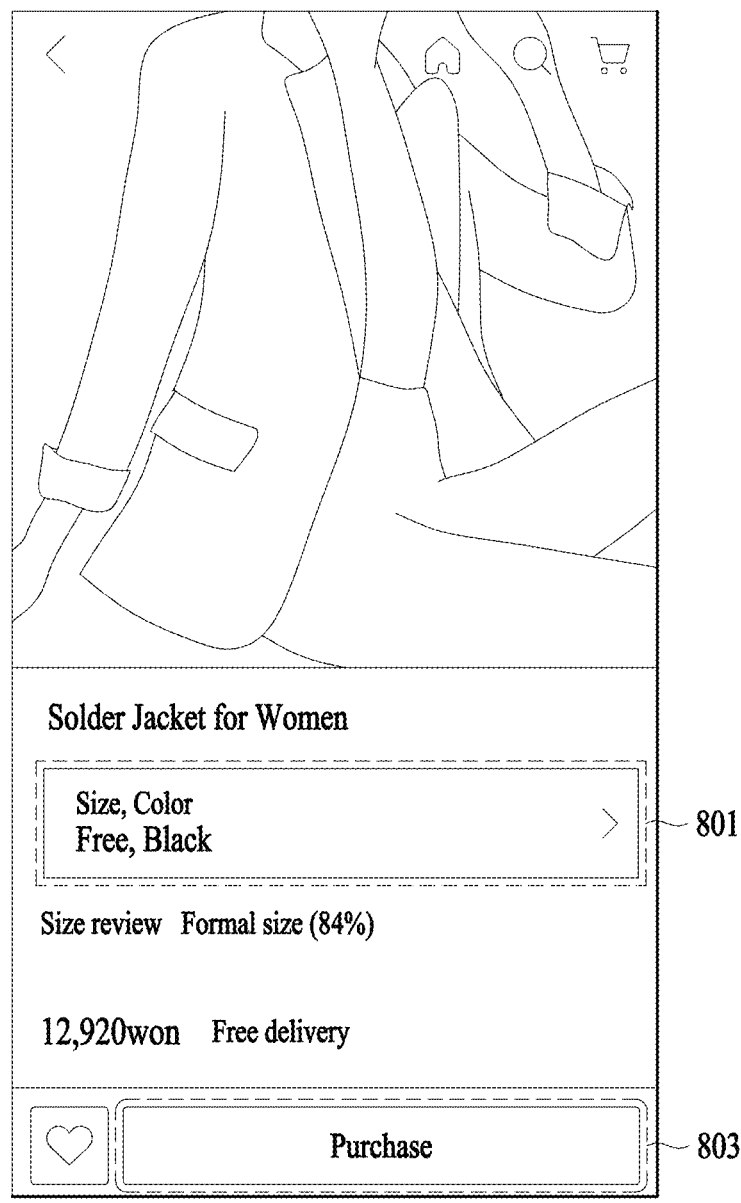
FIGS. 8 and 9 are diagrams illustrating examples in which the user device outputs an item detail page to the user in response to a user's input to a color chip on the basis of an operation of the server device according to various example embodiments.
Figure 9:
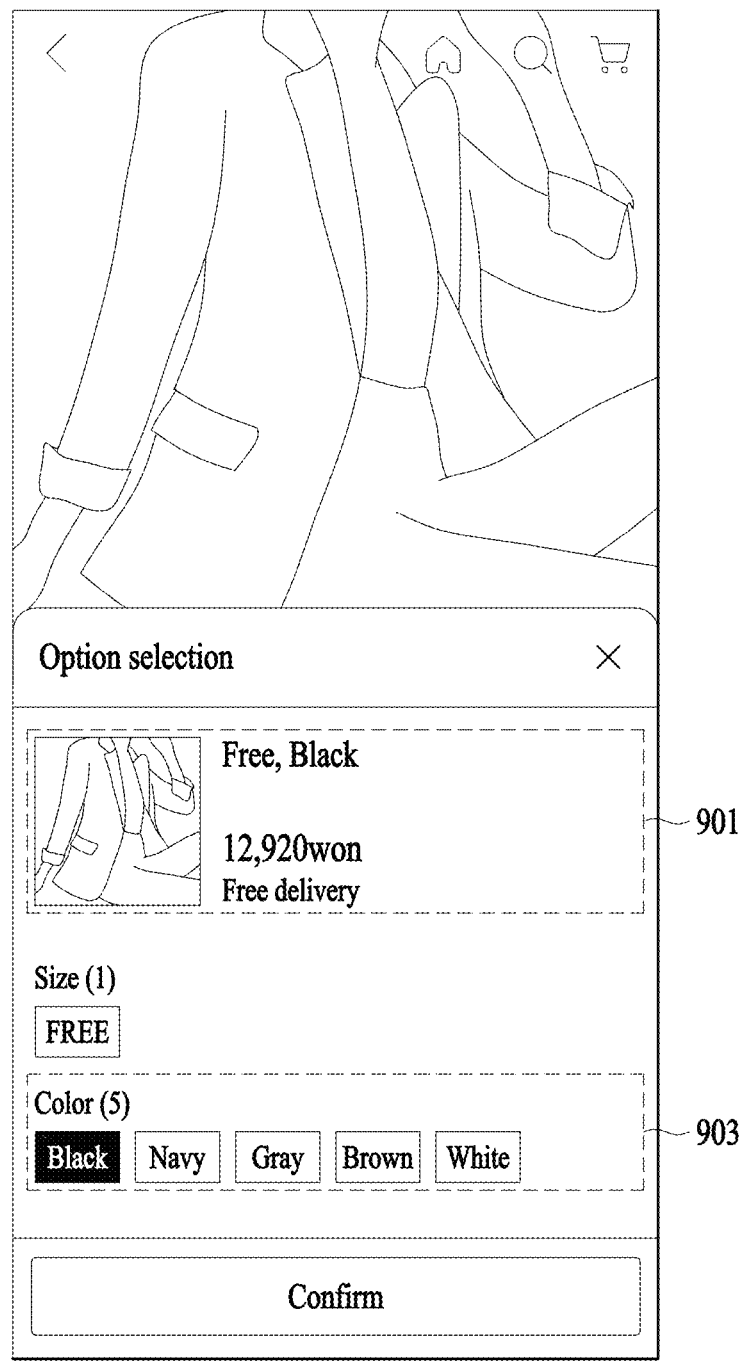

FIGS. 7 to 9 are diagrams illustrating examples of the user interface (UI)/user experience (UX) of providing item information according to various example embodiments. For example, the examples illustrated in FIGS. 7 to 9 may be UI/UXs for the user device 200. Each example embodiment described with reference to the figures may be implemented on the basis of the operation of the server device 100 described above with reference to FIG. 3.

Specifically, each example embodiment associated with the UI/UX for the user device 200 described with reference to the figures may be implemented in such a way that, the user device 200 receives information input by the user and transmits the same to the server device 100, the server device 100 provides information corresponding to the input information received from the user device 200 to the user device 200 according to the operations described with reference to FIG. 3, and the user device 200 outputs the respective information. However, each example embodiment associated with the UI/UX described with reference to the figures is not limited thereto and may be implemented in any form as long as it can implement the UI/UX.

FIG. 7 is a diagram illustrating an example in which the user device 200 outputs a search result page to a user on the basis of the operation of the server device 100 according to various example embodiments.

Referring to FIG. 7, upon acquiring a keyword of "spring jacket" from the user, the user device 200 outputs a search result page including a search result corresponding to the keyword (a region 701). Specifically, the search result page provides the search result including information about a product group associated with a "female shoulder jacket" and color chips corresponding thereto (a region 703), and provides the search result including information about a product group associated with a "female over-fit double jacket" and the color chip corresponding thereto (a region 705).

The search results output to the user through the regions 703 and 705 on the search result page may include the information about the product groups associated with the "female shoulder jacket" and the "female over-fit double jacket", and the information about the product groups may include product purchase-related information, such as a name, price, and discount rate of the respective product group. Further, the information about the product group may include image information for the product group, which is provided on a portion of each of the regions 703 and 705. In this case, the image information output on the search result page may correspond to image information about a product determined for the information about the product group.

Further, a color chip for the product group may be included in the search result in the region 703 region (a region 707), and a color chip for the product group may be included in the search result in the region 705 (a region 709). The color chips for the product groups indicated in the regions 707 and 709 may be determined based on color information selectable for the respective product groups. Each color chip may correspond to the information in the various example embodiments described above, or the information about each color chip may include the information in the various example embodiments described above.

As shown in FIG. 7, product color information in the image information output in relation to the product group "female shoulder jacket" displayed in the region 703 may be color information corresponding to the color chip with the identification information indicated to correspond to the product. Similarly, product color information included in the image information output in relation to the product group "female over-fit double long jacket" may be color information corresponding to the color chip with the identification information indicated to correspond to the respective product.

When the user makes an input with respect to a specific color chip 711 displayed in the search result page using a mouse, the image information included in the search result in the region 703 may be changed into image information about a product with color information corresponding to the specific color chip from included in the product group "female shoulder jacket". Further, as illustrated in FIGS. 8 and 9, when the user clicks the specific color chip, an item detail page of a product with color information corresponding to the specific color chip included in the product group "female shoulder jacket", may be provided.

FIGS. 8 and 9 are diagrams showing examples in which, when the user makes an input with respect to a color chip, the user device 200 outputs an item detail page to the user in response to the operation of the server device 100 according to various example embodiments.

FIG. 8 is a diagram illustrating an example in which, when the user clicks the color chip 711 in FIG. 7, the user device 200 outputs the item detail page of a product with color information corresponding to the color chip 711. The item detail page in FIG. 8 may include product purchase-related information, such as a name, price, discount rate, and image of the product with the color information corresponding to the color chip 711 in FIG. 7. This item detail page may be the same as the information included in the search result output in the region 703 in FIG. 7.

In the item detail page in FIG. 8, the product color information may be basically set to color information "Black", which is the color information corresponding to the color chip 711 (a region 801), and a product set as an item the user wants to purchase may also be basically one with the color information "Black" (a region 803). When the user makes an input with respect to the region 801 indicating the color information in the item detail page, as illustrated in FIG. 9, the user device 200 may output a color information change region.

FIG. 9 is a diagram illustrating an example in which, when the user clicks the region 801 in FIG. 8, the user device 200 outputs the color information change region in which the color of the product is changed.

As illustrated in the color information change region in FIG. 9, "Black" as the color information has been basically selected (a region 901), and other pieces of color information selectable for the respective product group are also listed (a region 903). When the user makes an input to select any one of the other pieces of selectable color information, the product color information may be changed to the selected color information, and the item the user wants to purchase may also be changed to a product with the selected color information.

The UI/UX for the user device 200 in FIGS. 7 to 9 and the operation of the user device 200 may be performed in association with the operations of the server device 100 described with reference to FIG. 3. The examples of the UI/UX illustrated in FIGS. 7 to 9 are merely examples for implementing the present disclosure and the various example embodiments of the present disclosure are not limited to the examples of the UI/UX illustrated in FIGS. 7 to 9. Other various examples of the UI/UX may be applied as long as they can implement various example embodiments of the present disclosure.

The example embodiments of the present disclosure disclosed in the present specification and the figures are merely specific examples disclosed to easily explain the technical content of the present disclosure and further facilitate overall understanding of the present disclosure, and are not intended to limit the scope of the present disclosure. That is, it will be apparent to those skilled in the art that other variations based on the technical ideas of the present disclosure may be made. In addition, the respective example embodiments described above may be implemented in combination with each other as necessary. For example, all example embodiments of the present disclosure may be implemented by a system in combination with parts.

Furthermore, the method executed by the system or the like according to the present disclosure may be implemented in the form of program instructions, which may be carried out through various computer means, and recorded on a computer-readable medium.

As described above, various example embodiments of the present disclosure may be implemented with computer-readable codes in a computer-readable recording medium from a specific point of view. The computer-readable recording medium is any data storage device capable of storing data that may be read by a computer system. Examples of the computer-readable recording medium may include a read only memory (ROM), a random-access memory (RAM), compact disk-read only memories (CD-ROMs), magnetic tapes, floppy disks, optical data storage devices, and carrier waves (such as data transmission over the Internet). Further, the computer readable recording medium may be distributed through network-connected computer systems. Thus, the computer-readable codes are stored and executed in a distributed manner. In addition, functional programs, codes, and code segments for implementing various example embodiments of the present disclosure may be easily interpreted by those skilled in a field to which the present disclosure is applied.

Further, it will be appreciated that apparatuses and methods according to various example embodiments of the present disclosure are implemented in the form of hardware, software, or a combination of hardware and software. Such software may be stored in a volatile or non-volatile storage device such as a storage device such as a ROM, or a memory such as a RAM, a memory chip, a device or an integrated circuit, or, for example, an optically or magnetically recordable storage medium or a machine (for example, a computer)-readable storage medium, such as a compact disk (CD), a digital versatile disc (DVD), a magnetic disk, or a magnetic tape, regardless of a removable or rewritable function. It will be appreciated that the method according to various example embodiments of the present disclosure may be implemented by a computer including a controller and a memory, a vehicle including such a memory or computer, or the like. The memory is an example of a storage medium that is readable by a machine suitable for storing a program or programs including instructions for implementing example embodiments of the present disclosure or storing programs.

Accordingly, the present disclosure encompasses a program including codes for implementing an apparatus or method defined in the claims of the present specification and a machine (a computer or the like)-readable storage medium that stores such a program. In addition, such a program may be electronically transmitted through any medium such as a communication signal that is delivered in a wired or wireless connection, and the present disclosure may suitably encompass things equivalent to the same.

While various example embodiments of the present disclosure have been described above, the example embodiments of the present disclosure disclosed in the present specification and the figures are merely specific examples disclosed to easily explain the technical content of the present disclosure and further facilitate overall understanding of the present disclosure, and are not intended to limit the scope of the present disclosure. Further, the above-described example embodiments of the present disclosure are merely examples, and it will be apparent to those skilled in the art that other variations and example embodiments equivalent to the same may be made. Accordingly, the true technical scope of the present disclosure should be defined by the following claims.

What is claimed is:

1. A method of providing search information by an electronic apparatus, the method comprising:
  receiving, from user device, a keyword;
  determining, based on the keyword, information on a product group corresponding to the keyword;
  determining, based on the information on the product group, color information on one or more products included in the product group;
  determining, based on the color information, one or more color icons;
  determining, for the one or more products in the product group, a display order; and
  generating, based on the keyword, the information on the product group, the color information, and the one or more color icons, a search result page corresponding to the keyword with the color icons arranged in the determined display order and representing selectable user interface regions on the search results page,
  wherein the search result page includes at least some color icons of the one or more color icons corresponding to the information on the product group and the color information on the one or more products.

2. The method of claim 1, wherein determining the information on the product group is further based on a product with a highest sales volume among the one or more products.

3. The method of claim 1, further comprising:
  determining, for a product corresponding to each of the at least some color icons, a sales volume,
  wherein the determining the display order in which the at least some color icons of the one or more color icons are displayed is based on the determined sales volume of the product.

4. The method of claim 1, wherein the information on the product group is determined as information on a first registered product among the one or more products.

5. The method of claim 1, further comprising:
  determining, for a product corresponding to each of the at least some color icons, a registration order,
  wherein the determining the display order in which the at least some color icons of the one or more color icons are displayed is based on the determined registration order of the product.

6. The method of claim 1,
  wherein the information on the product group includes image information on a product determined for the information on the product group, and
  wherein the method further comprises:
    changing, based on user input with respect to a first color icon included in the at least some color icons on the search result page, the image information to first image information on a first product corresponding to the first color icon.

7. The method of claim 6, wherein the first color icon is included in the at least some color icons based on that the first image information is included in a detail page of the first product.

8. The method of claim 1, the method further comprising:
  receiving user input relating to the information on the product group;
  determining, based on the received user input, a product and a corresponding product information; and
  generating, based on the product information, a product detail page for display on the user device.

9. The method of claim 1, the method further comprising:
  receiving user input relating to a first color icon of the at least some color icons;
  determining, based on the received user input, a product;
  determining, based on the product, product information; and
  generating, based on the product information, a product detail page for display on the user device.

10. The method of claim 9, wherein information on the first color icon includes information on a uniform resource locator (URL) corresponding to the product detail page of the product.

11. The method of claim 9,
  wherein the product detail page of the product includes color change information for selecting color information corresponding to the at least some color icons, and
  wherein the method further comprises:
    changing, based on user input with respect to the color change information to configure to second color information, an item from the product to a second product corresponding to the second color information.

12. The method of claim 1, the method further comprising:
  displaying information for identifying a color icon corresponding to the information on the product group among the at least some color icons.

13. The method of claim 1, the method further comprising:
  determining, based on the information on the product group, a product, wherein information on a first color icon included in the at least some color icons includes information on whether or not the first color icon is a color icon corresponding to the product.

14. The method of claim 1, wherein the at least some color icons are a certain number of color icons selected from the one or more color icons, and
wherein a number of remaining color icons other than the certain number of color icons selected from the one or more color icons is displayed on the search result page.

15. The method of claim 1, wherein the at least some color icons are determined based on a stock quantity of a product corresponding to each of the at least some color icons.

16. The method of claim 1, the method further comprising:
receiving, from the user device, a first color keyword indicating first color information corresponding to a first color icon included in the at least some color icons and at least one color keyword indicating at least one color information in a range similar to the first color information;
configuring a color keyword set including the first color keyword and the at least one color keyword; and
configuring information on the first color icon including information on the color keyword set.

17. The method of claim 16, wherein the first color keyword and the at least one color keyword are acquired from a provider linked to the product group through a service associated with the electronic apparatus.

18. The method of claim 16, the method further comprising:
when a color keyword included in the color keyword set is acquired for registering of a product included in the product group, configuring the first color icon to a color icon corresponding to color information indicated by the color keyword and the product.

19. An electronic apparatus of providing search information, comprising:
a processor; and
one or more memories storing one or more instructions, wherein the one or more instructions, when executed by the processor, control the electronic apparatus to:
receive, from user device, a keyword;
determine, based on the keyword, information on a product group corresponding to the keyword;
determine, based on the information on the product group, color information on one or more products included in the product group; and
determine, based on the color information, one or more color icons;
determining, for the one or more products in the product group, a display order; and
generate, based on the keyword, the information on the product group, the color information, and the one or more color icons, a search result page corresponding to the keyword with the color icons arranged in the determined display order and representing selectable user interface regions on the search results page,
wherein the search result page includes at least some color icons of the one or more color icons corresponding to the information on the product group and the color information on the one or more products.

20. An electronic apparatus for outputting search information, comprising:
a processor; and
one or more memories storing one or more instructions, wherein the one or more instructions, when executed by the processor, control the electronic apparatus to:
receive, from a user, a keyword associated with a product group;
transmit, to a server device, the keyword;
receive, from the server device, a search result page including at least some color icons of one or more one color icons corresponding to information on the product group and color information on one or more products included in the product group, in response to the keyword; and
output the search result page,
wherein the one or more color icons are arranged in a display order related to the received keyword, and
wherein the one or more color icons represent selectable user interface regions on the search results page.

* * * * *